United States Patent [19]

Boutilier

[11] Patent Number: 4,761,110
[45] Date of Patent: Aug. 2, 1988

[54] VEHICLE LIFTING AND TOWING APPARATUS

[75] Inventor: Roland A. Boutilier, Halifax, Canada

[73] Assignee: Tradex Limited, Canada

[21] Appl. No.: 18,838

[22] Filed: Feb. 24, 1987

Related U.S. Application Data

[63] Continuation of Ser. No. 876,087, Jun. 19, 1986, abandoned, which is a continuation of Ser. No. 614,534, May 29, 1984, abandoned.

[30] Foreign Application Priority Data

May 30, 1982 [CA] Canada ................................ 429199

[51] Int. Cl.⁴ ................................................ B60P 3/12
[52] U.S. Cl. .................................... 414/563; 280/402; 280/503
[58] Field of Search ................. 414/563; 280/402, 503

[56] References Cited

U.S. PATENT DOCUMENTS

| | | | |
|---|---|---|---|
| 1,408,002 | 2/1922 | Heymoss | 414/563 |
| 1,886,681 | 11/1932 | Hubbard | 414/563 X |
| 2,255,624 | 9/1941 | Luse | 280/503 X |
| 2,495,493 | 1/1950 | Wright | 414/563 X |
| 2,564,111 | 8/1951 | Kimball | 414/563 |
| 2,625,279 | 1/1953 | Dalby et al. | 414/563 |
| 3,871,535 | 3/1975 | Fenske | 414/563 |
| 4,274,791 | 1/1981 | Moon | 414/563 |

Primary Examiner—Robert J. Spar
Assistant Examiner—David A. Bucci
Attorney, Agent, or Firm—Stevens, Davis, Miller & Mosher

[57] ABSTRACT

A vehicle lifting and towing apparatus is adapted to be mounted beneath the floor at the rear portion of a vehicle. The lifting frame (16) includes the intermediate portion (12) of a divided rear bumper and is pivotally mounted on bracket plates (20) attached to the rear of the vehicle main frame members (22). A sub-frame (42) is mounted to and is longitudinally slidable beneath the main frame members (22) and pivotally connects to the lifting frame (16) at a point spaced below the axis on which the lifting frame is mounted. Rearward movement of the sub-frame (42) by means of hydraulic actuators (48) causes the lifting frame (16) to pivot upwards into an operative load carrying position. The sub-frame members (44) are shaped to transfer load from the sub-frame (42) via a plate (72) to the rear axle of the towing vehicle when the sub-frame (42) is in a rearward position.

17 Claims, 5 Drawing Sheets

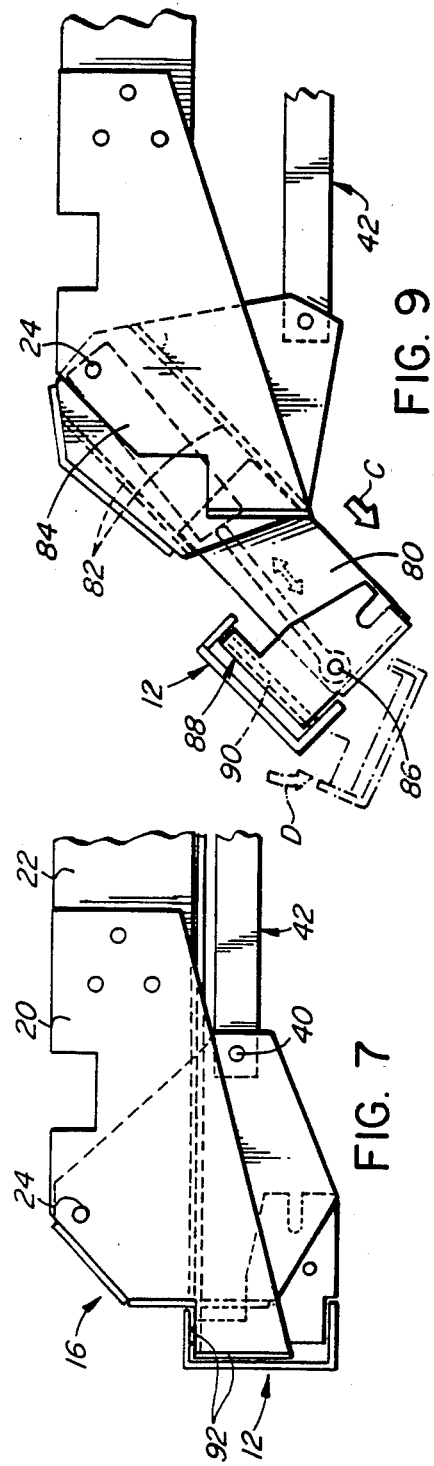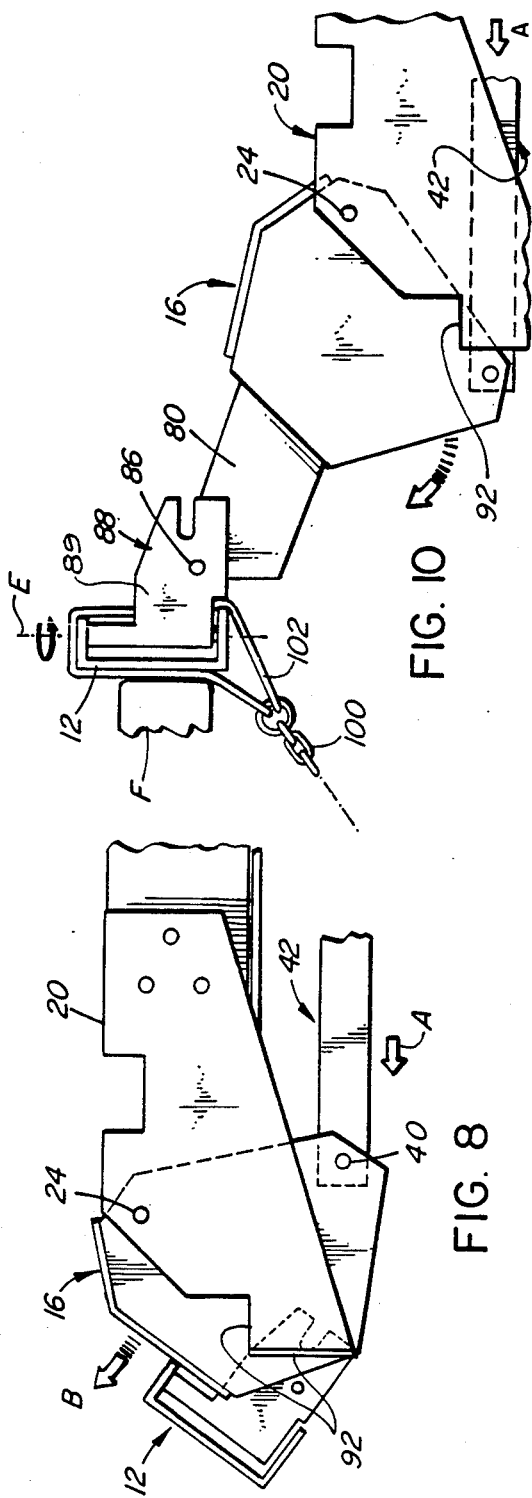

VEHICLE LIFTING AND TOWING APPARATUS

This application is a continuation of application Ser. No. 876,087, filed June 19, 1986, now abandoned, which is a continuation of application Ser. No. 614,534 filed May 29, 1984, now abandoned.

BACKGROUND OF THE INVENTION

This invention relates to improved lifting and towing apparatus for vehicles and in particular relates to lifting and towing apparatus adapted to be mounted beneath the floor at the rear portion of a vehicle. The invention is particularly suited to, although not limited to, light vehicles such as pick-up trucks and various type of recreational and utility vehicles.

The prior art has provided various lifting and towing arrangements which are adapted to be mounted beneath the bed of the truck thus leaving the bed substantially unobstructed for normal useage with the actual working engaging elements of the lift being disposed just rearwardly of the truck bed. An example of one such prior art arrangement is shown in U.S. Pat. No. 3,667,631 issued June 6, 1972 to Bishop. This patent discloses a hydraulic utility lift for pick-up trucks and other vehicles consisting of a frame adapted to be mounted under the rear portion of the truck bed and carrying a lift arm adapted to lift a load disposed rearwardly of the truck as such arm is pivoted from a downwardly and rearwardly inclined position to a substantially horizontal position. A hydraulic ram is provided for pivoting the arm and the linkage operatively connects the ram to the arm. The linkage is arranged such that it converts horizontal movements of the ram to vertical movement lifting the arm so that the arm may be elevated to provide better ground clearance for the lift, an effort also being made in the design to provide a somewhat more uniform power ratio for the ram.

Another form of lifting and towing arrangement mounted, in essence, below the bed of a truck is shown in U.S. Pat. No. 2,715,470 issued Aug. 16, 1955 to Marcus et al. This patent discloses a hydraulically activated platform for lifting and carrying a wrecked car, which platform is also arranged to serve as a tailgate for the truck, the object of the invention being to provide a wreck-lifting device which is alleged not to substantially interfere with the normal use and loading of the truck.

The known prior art devices suffer from a number of disadvantages. One serious disadvantage is that they apply, when in use, a very substantial amount of additional strain to the main frame of the vehicle and, if the loadings are high, substantial damage can occur. In addition, the extra loadings on the vehicle incurred as a result of the weight of the vehicle being towed must be taken up by the main springs of the vehicle with the result being that the vehicle tends to "squat down" or sway under the influence of these loadings. This is most undesirable since it reduces the available ground clearance and may make the tow vehicle unstable. Furthermore, the prior art devices generally tend to reduce the available ground clearance to an unacceptable degree, especially when loaded, and, moreover, such devices do not allow for the use of the normal rear vehicle bumper when in the inactive or retracted mode. Certain of the prior art arrangements are also difficult to attach or remove from the vehicle with the result being that the lift-tow arrangement tends to be left on the vehicle at all times thus in some cases reducing its usefulness for other types of work or, at the least, creating additional weight which must be carried around at all times with a resulting deduction in fuel economy.

SUMMARY OF THE INVENTION

It is a general object of the invention to provide an improved lifting and towing apparatus of the character described which is intended to alleviate the difficulties enumerated above with the known prior art arrangements.

It is a further object of the invention to provide a lifting and towing apparatus adapted to be mounted beneath the floor at the rear portion of a vehicle which will not obstruct the box of loading area of the vehicle.

It is a further object of the invention to provide a lifting and towing apparatus which is so arranged that when the lifting and towing apparatus is in use, the additional loadings imposed by the vehicle being towed are transmitted to the axle of the tow vehicle in such a way that the vehicle's suspension springs are at least partially isolated from these loadings thereby to offset the tendency for the two vehicle to squat down or sway under the influence of the additional loadings.

It is a further object of the invention to provide a lift-tow arrangement especially suited for light trucks and recreational vehicles which lift-tow apparatus is so arranged that in the retracted position its' vehicle engaging components lie substantially flush with a fixed portion of the rear bumper arrangement thus presenting a very neat and attractive appearance, virtually indistinguishable in overall general appearance from the rear bumper arrangement associated with a comparable vehicle which has not been equipped with such lifting and towing apparatus.

Further objects of the invention are to provide a lifting and towing apparatus of the character described wherein such apparatus may be attached or removed from the vehicle in the completely assembled condition thus allowing the apparatus to be attached and detached by unskilled personnel and in a minimum of time.

Further objects are to provide lifting and towing apparatus which is of simple and relatively sturdy construction, which may be manufactured and sold at a reasonable cost, which unit is compact and, as noted above, is arranged such that the original styling of the towing vehicle is substantially maintained.

A lifting and towing apparatus in accordance with one aspect of the invention is adapted to be mounted below the body of a vehicle having a main frame and an axle assembly with suspension springs located between the axle assembly and main frame. The lifting and towing apparatus typically includes bracket means and means defining a main pivot axis which is connectable to rearwardly disposed portions of the main frame of the vehicle. A lifting frame is pivotally secured to these bracket means for pivotal movement between raised and lowered positions to effect the raising and lowering of another vehicle when secured to the lifting frame. Actuator means are operatively connected to the lifting frame for effecting the pivoting movement of same.

One feature of the invention provides load transmitting means operatively connected to the actuator means and moveable simultaneously with the lifting frame to a position such that loadings applied to the lifting frame are transferred from the main frame of the vehicle to the axle assembly of same via such load transmitting means. This is done such that the suspension springs are at least partially isolated from loadings applied to the lifting frame thus effectively reducing the tendency for the vehicle to squat down or sway under the extra loadings applied by the vehicle being lifted or towed.

In the preferred form of the invention the load transmitting means comprise an elongated sub-frame which is adapted to be mounted to the main frame of the vehicle for movement longitudinally of same. This sub-frame is connected to the lifting frame via a second pivot means which is spaced from the main pivot axis. Accordingly, longitudinal movement of the sub-frame causes the pivoting movement of the lifting frame. The actuator means are operatively connected via the sub-frame to the lifting frame.

In the preferred form of the invention the sub-frame includes knee portions therein adapted to come into close proximity to the axle assembly of the vehicle when in a position corresponding to the raised position of the lifting frame to effect the transmission of forces therebetween. The above-noted sub-frame is preferably in the form of a pair of spaced elongated members each locatable beneath a respective one of the main frame members. Attachment means are provided for securing the sub-frame to the main frame and permitting sliding motion of the sub-frame relative thereto.

The above-noted actuators preferably comprise hydraulic cylinders extending longitudinally of the sub-frame members and adapted to effect sliding movement thereof to effect the raising or lowering of the lifting frame.

It should be noted that the use of the elongated sub-frame is of importance quite apart from its capability of transmitting loads from the main frame to the axle assembly. In a separate aspect of the invention the elongated sub-frame, in use, performs a dual function in that it serves to operatively connect the actuator means to the lifting frame and, in addition, serves to reinforce the vehicle main frame and reduce bending moments in same. This particular arrangement employing longitudinally extending actuators and longitudinally moveable sub-frame also provides for excellent ground clearance capability as compared with various prior art devices.

As a further feature of the invention, the apparatus includes means for engaging the vehicle to be lifted and towed, which means are connected to the lifting frame via a telescoping assembly. A hydraulic actuator within the telescoping assembly moves the engaging means between a position in close proximity to the lifting frame to a position spaced therefrom.

In the preferred form of the invention the above-noted means for engaging includes a vehicle bumper section with pivot means being provided to permit rotation of such vehicle bumper section about both horizontal and vertical axes when in a position which is spaced from the lifting frame. Means are also provided to secure the bumper section in a fixed position when retracted. A pair of spaced bumper sections are affixed to the bracket means and disposed in flanking relation to the intermediate bumper section when the latter is in its retracted position.

Further features and advantages of the invention will be readily apparent from the following description of a preferred embodiment of same taken in conjunction with the drawings.

BRIEF DESCRIPTION OF THE VIEWS OF DRAWINGS

In drawings which illustrate an embodiment of the invention:

FIGS. 7 through 10 are a series of side elevation views illustrating the relative positions of the bracket means, lifting frame and telescopically mounted vehicle engagement means during various phases of operation.

DESCRIPTION OF THE PREFERRED EMBODIMENT OF THE INVENTION

Figure 1:
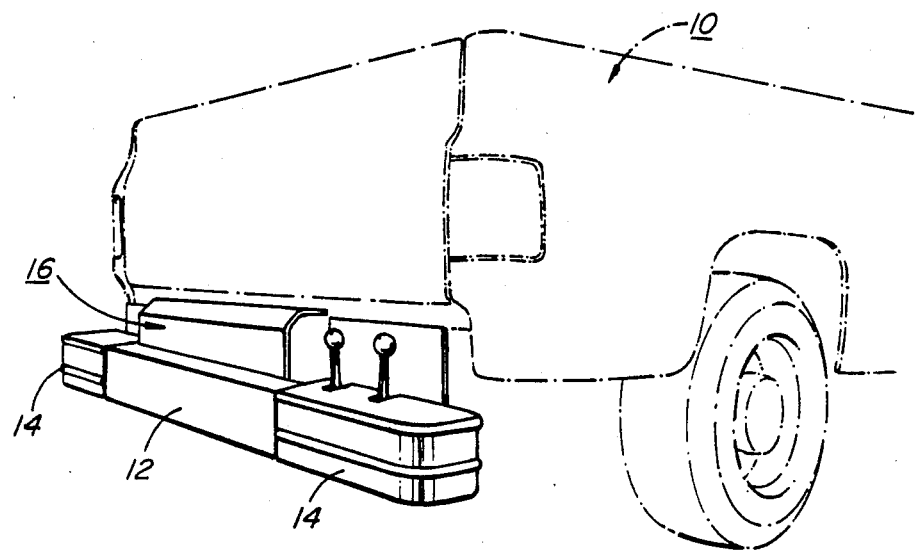
FIG. 1 is a perspective view of a rear portion of a pick-up truck employing a lifting and towing apparatus in accordance with the invention, the lifting frame of same being in the lowered position.
Figure 2:
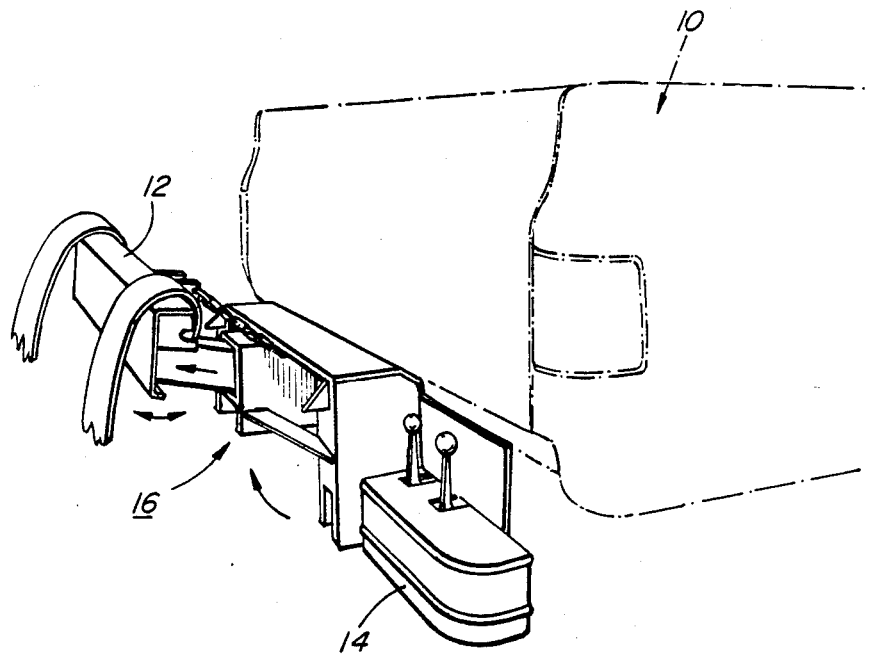
FIG. 2 is a perspective view similar to that of FIG. 1 but with the lifting frame raised and the vehicle engaging member in the extended condition.

Referring now to the drawings FIGS. 1 and 2 show, in phantom, the rear end portion of a pick-up truck 10. In FIG. 1, there is shown a portion of the lifting and towing apparatus in accordance with the invention including an intermediate bumper portion 12 and a pair of spaced bumper sections 14 arranged in flanking relationship to the intermediate bumper portion 12. Intermediate bumper portion 12 is essentially flush with the bumper portion 14 when the bumper portion 12 is in the retracted position shown in FIG. 1.

The intermediate bumper portion 12 is secured to a lifting frame 16, a portion of which is visible in FIG. 1, such lifting frame 16 being disposed at and extending generally transversely on the rear portion of the vehicle. In FIG. 2 this lifting frame 16 is shown as having been pivoted to its raised position and it will be seen that the intermediate bumper portion 12 has been shifted outwardly and away from the lifting frame 16 and this is the position that it occupies when another vehicle (not shown) is being towed. The intermediate bumper portion 12 is capable of pivotal movement relative to the lifting frame 16 about both horizontal and vertical axes thereby to accommodate the usual pitching and yawing movements which take place during the course of a lifting and towing operation.

Figure 3:
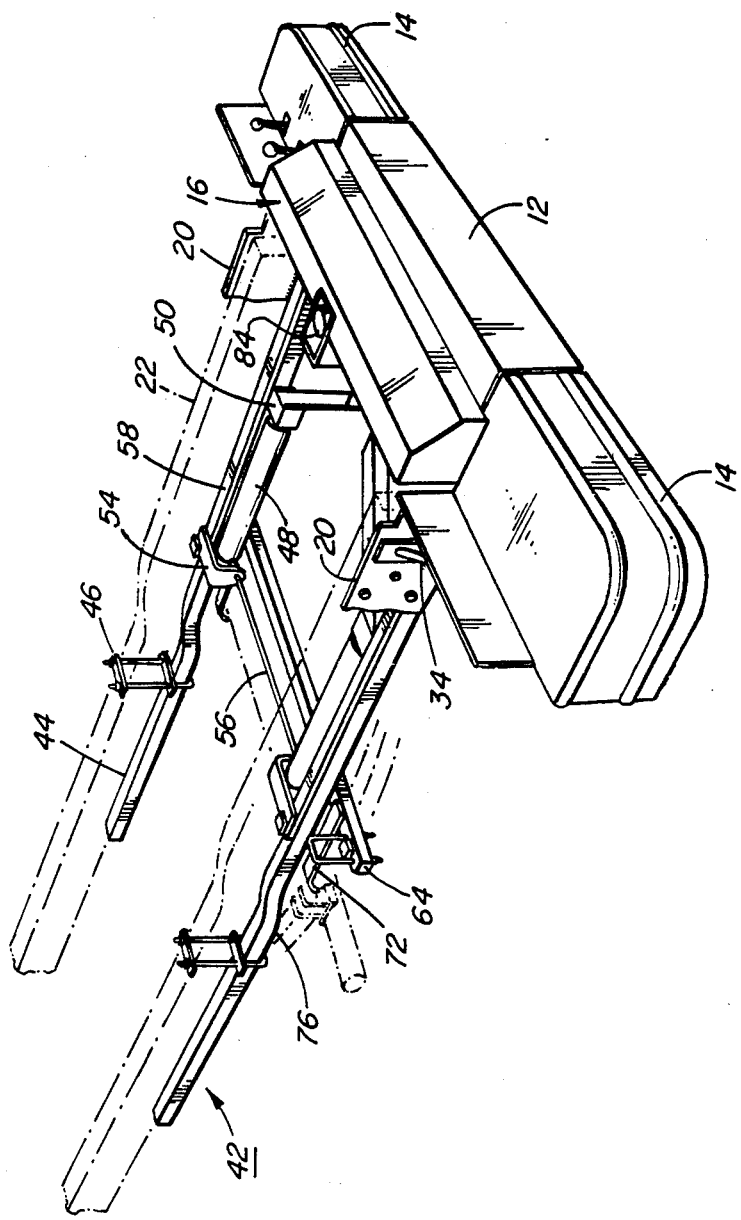
FIG. 3 is a perspective view of the lifting and towing arrangement per se, the main frame of the vehicle and the spring and axle assembly of same being shown in phantom.
Figure 4:
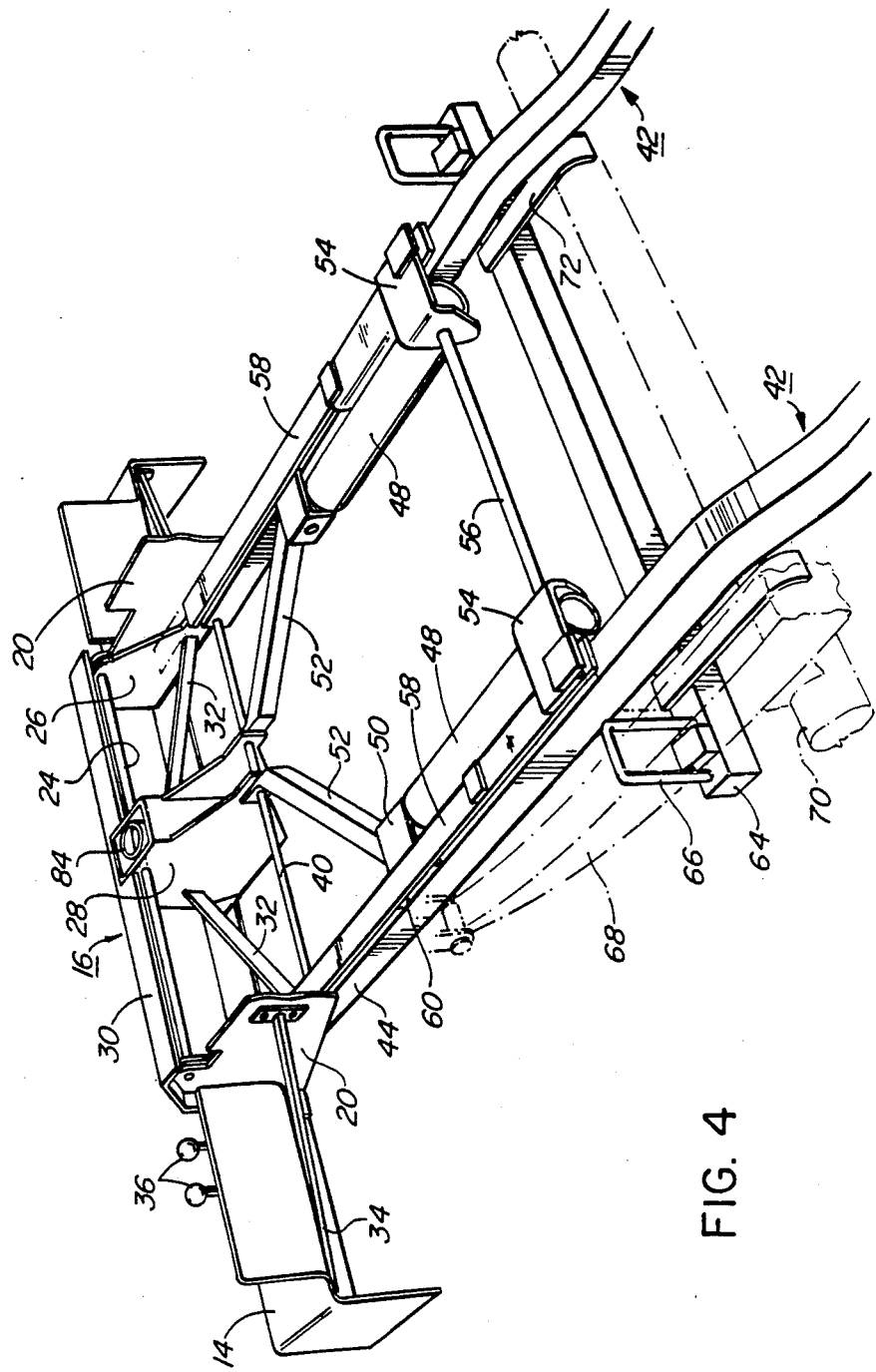
FIG. 4 is a further perspective view of the lifting and towing assembly, the latter having been rotated about 180° from the position shown in FIG. 3.

Referring now to FIGS. 3 and 4, the lifting and towing apparatus is shown in greater detail. The apparatus includes a pair of transversely spaced main bracket plates 20 which are connectable to rearwardly disposed transversely spaced portions of the main frame 22 (shown in phantom in FIG. 3) of the vehicle. A main pivot shaft 24 defining a main pivot axis extends through and is supported by the spaced bracket plates 20. The previously noted lifting frame 16 is mounted on this main pivot shaft 24 so that it can be rotated between the lowered position shown in FIGS. 1, 3 and 4 and the raised position shown in FIGS. 2, 6 and 10.

The lifting frame 16, as previously noted, extends transversely of the rear portion of the vehicle and it is of a sturdy welded construction. It includes end plates 26 disposed immediately inwardly of the main bracket plates 20, a centrally located box-like housing portion 28, and an outer shroud or casing portion 30 made of relatively heavy steel plate which defines the top and rearwardly facing surfaces of the lifting frame. This shroud 30 is securely welded to the end-plates 26 and the centrally located housing portion 28 and this, together with the diagonally arranged braces 32 provides the lifting frame 16 with the necessary structural strength and rigidity.

It will be readily seen from FIGS. 3 and 4 that the outer fixed bumper portions 14 are securely connected to the main bracket plates 20 by suitable fasteners (not shown) with brace members 34 assisting in providing the necessary rigidity. One of these fixed bumper portions 14 serves to mount a pair of control levers 36 for the hydraulic actuators to be hereafter described.

Both the end-plates 26 and the central housing portion 28 of the lifting frame 16 have forwardly extended portions having aligned apertures therein through which extends a second pivot shaft 40. This pivot shaft 40 also extends through aligned apertures provided in the rear end portions of an elongated sub-frame 42 which is supported beneath the main frame 22 of the vehicle for longitudinal substantially rectilinear movement relative thereto in the manner best illustrated in FIGS. 5 and 6. Sub-frame 42 includes a pair of spaced elongated frame members 44 each of which is locatable beneath a respective one of the members of the main frame 22. Suitable attachment means including hanger brackets 46 serve to secure the sub-frame 42 beneath the main frame and permit sliding motion of the sub-frame 42 relative to the main frame. Since, as noted previously, the rear end portions of sub-frame 42 are secured to lifting frame 16 via the second pivot shaft 40, and since the second pivot shaft 40 is spaced from and positioned well below the main pivot shaft 24 as best seen in any of FIGS. 5 through 10, it will readily been seen that longitudinal movement of sub-frame 42 causes pivotal movement of lifting frame 16 about the main pivot shaft 24. Hence, as sub-frame 42 is moved rearwardly, the lifting frame 16 is rotated to its fully raised position and as sub-frame is moved forwardly relative to the vehicle, lifting frame 16 is rotated to its fully down position.

In order to effect the above-noted longitudinal movement of sub-frame 42, there is provided a spaced apart pair of double acting hydraulic actuators 48, the rams of which are connected to sub-frame members 44 via respective brackets 50. In order or reduce stresses in the lifting frame 16, the sub-frame 42 also includes diagonally arranged force transmitting members 52 which extend from brackets 50 inwardly toward the forwardly extending portions of the box-like housing portion 28 of lifting frame 16. It will be seen hereafter that it is this housing portion 28 which is required to accommodate the loadings imposed by a vehicle being lifted and towed by the apparatus.

The opposing forwardly disposed ends of hydraulic actuators 48 are pivotally connected to respective brackets 54 by way of a third pivot shaft 56. These brackets 54 are rigidly connected to the main bracket plates 20 via respective elongated reaction members 58 each of which overlies a respective one of the members 44 of the sub-frame 42. The reaction members are provided with spaced apart pads 60 which bear against the sub-frame members to reduce friction and wear.

Figure 5:
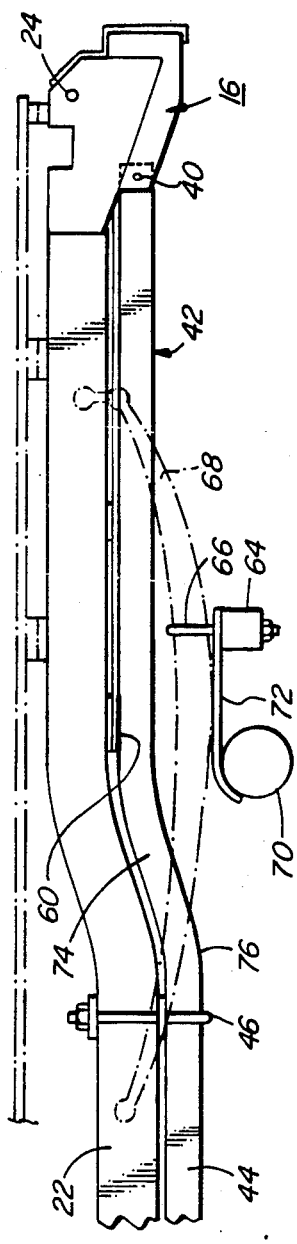
FIG. 5 is a side elevation view of the lifting and towing assembly per se with the lifting frame being in the down position and the sub-frame fully advanced.
Figure 6:
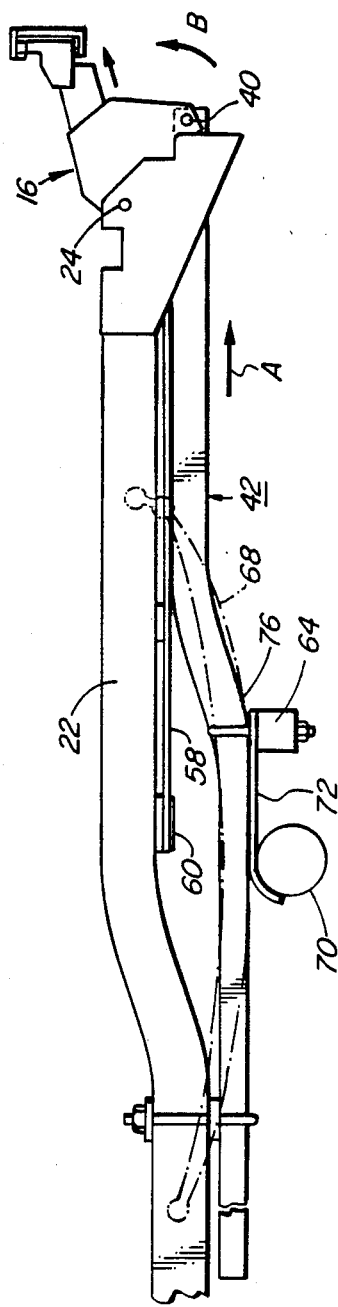
FIG. 6 is a view similar to that of FIG. 5 but with the sub-frame in its rearward position and illustrating the load transmitting capability of the sub-frame.

As seen in FIGS. 3-6, a transversely extending bar 64 is secured by brackets 66 to the leaf-type suspension springs 68 (shown in phantom) of the vehicle just rearwardly of the rear axle housing 70 of the vehicle. Relatively short load transfer plates 72, each disposed directly beneath a respective one of the sub-frame members 44, have their rearward ends connected to the elongated bar 64 and their forward ends resting directly on the rear axle housing 70. As best seen in FIGS. 5 and 6, the main members 44 of sub-frame 42 are each provided with a reversely curved section 74 defining a knee portion 76 on each frame member 44. With continued reference to FIGS. 5 and 6, a sub-frame 42 is moved rearwardly in the direction of arrow A, with the lifting frame 16 being rotated upwardly in the direction of Arrow B, the knee portions 76 of the sub-frame 42 come into contact with the load transfer plates 72 described above. With reference to FIG. 6, in the rearmost position of sub-frame 42, the knee portions 76 are fully positioned on the load transfer plates 72. Hence, as downward loadings are applied to the lifting frame 16, such loadings are ultimately transmitted to sub-frame 42 and thence through the knee portion 76 of same onto the load transfer plates 72. Since the bar 64 is connected to the leaf springs fairly closely adjacent the rear axle housing the additional loadings imposed on the rear of the vehicle with the result being that little if any additional deflection of the rear springs of the vehicle applied to same. This substantially reduces or eliminates the tendency for the vehicle to be lowered downwardly, i.e. to squat down, under the influence of the additional loadings imposed by the vehicle being lifted and towed and also substantially reduces any tendency for the vehicle to sway under the influence of lateral forces. When the sub-frame 42 is moved forwardly to the position shown in FIG. 5, the knee portions 76 move ahead clear of the load transfer plates 72 with the result being that the vehicle springs 68 are free to function in the normal fashion.

The lifting frame 16 will now be further described with particular reference to FIGS. 7 through 10. The centrally disposed box-like housing portion 28 has been briefly referred to previously. This housing portion 28 serves to slidably support a telescoping member 80, the latter being a tubular member of an essentially square cross-section. Member 80 is slidably disposed within housing portion 28 for movement in the direction of arrow C. The interior of housing portion 28 is provided with internal partitions 82 (shown in phantom in FIG. 9) which, together with the sidewalls of housing portion 28, serve to guide and support the telescoping member 80. Also located within housing portion 28 with its ram portion extending within the telescoping member 80, is a further hydraulic actuator 84. The upper end of hydraulic actuator 84, also visible in FIGS. 3 and 4, is connected to the housing portion 28 of lifting frame 16 via the previously described main pivot shaft 24. The ram of hydraulic actuator 84 is connected to the outer end of telescoping member 80 via a shaft 86, such shaft 86 also serving to pivotally secure a load bracket 88 to the outer end of the telescoping member 80. Load bracket 88 includes spaced arm portions 89 which flank member 80 and through which arms shaft 86 passes. Shaft 86 permits load bracket 88 to be rotated about the end of the telescoping member in the direction of arrow D. This load bracket, in turn, serves to support the previously described intermediate bumper portion 12. Intermediate bumper portion 12 is secured to load bracket 88 half way along its length by way of a further pivot shaft 90 (shown in phantom FIG. 9). Pivot shaft 90 permits bumper portion 12 to rotate relative to load bracket 88 about the yaw axis E illustrated in FIG. 10.

With reference now to FIG. 7 it will be seen that the lifting frame 16 is in its "down" position and that the telescoping member 80 has been fully retracted thereby to bring the intermediate bumper portion 12 into its "home" position such bumper portion 12 being seated on rest portions 92 defined by rearwardly extending portions of the main bracket plates 20.

In FIG. 8, it will be seen that the sub-frame 42 has been moved rearwardly in the direction of arrow A by virtue of the force imparted by the two hydraulic actuators 48 thus causing the lifting frame 16 to be rotated clockwise in the direction of arrow B. Then, with reference to FIG. 9, hydraulic actuator 84 is activated thereby to extend the telescoping member 80 in the direction of arrow C. In this extended condition, towing chains 100 are connected to the rear axle of the vehicle to be towed in an entirely conventional manner. In the course of this action, the load bracket and intermediate bumper section pivot about shaft 86 thereby to bring the rear face of bumper section 12 into abutting relationship with the rear bumper of the vehicle to be towed. Following this the hydraulic actuator 84 is then retracted at least partially and following this the hydraulic actuators 48 are reactivated to shift sub-frame 42 further to the rear until the lifting frame 16 occupies the position shown in FIG. 10. Following this the hydraulic actuator 84 is fully extended such that the several parts occupy the relative positions illustrated in FIG. 10. It will be seen in FIG. 10 that the bumper F of the vehicle being towed is in abutting relationship with the frame portion 12. The towing chains 100 may be connected to the intermediate bumper portion 12 by means of flexible elements 102 made out of wide strips of heavy duty belting material. The towing chains and the belting material 102 are well known, per se, in the art of lifting and towing vehicles and form no part of the present invention. Those skilled in the art will readily appreciate how the same are to be used and attached to the lifting and towing arrangement of the present invention.

Since the control levers 36 of the hydraulic actuators are located on one of the fixed bumper portions 14 as previously described, the operator can readily observe the operation of the lifting and towing apparatus and thus effect close control of the hydraulic actuators. The hydraulic actuators are operated through suitable valve systems operatively connected to the valve control levers 36 from a hydraulic pump in a conventional manner. Accordingly a description of the hydraulic control system is not required. The hydraulic control may be incorporated into the lifting and towing arrangement or the system may be run off an existing hydraulic pump in the engine area of the tow vehicle.

The lifting and towing apparatus described herein possesses numerous advantages over prior art devices. As previously noted, the apparatus does not obstruct the box or loading area of the truck in any way and moreover it is very compact and maintains the original styling of the towing vehicle. This is readily apparent from an inspection of FIG. 1 wherein it will be seen that the lifting and towing apparatus, in the retracted position, is scarcely noticeable. Furthermore, the use of the unique sub-frame system coupled with the load transmitting capability substantially eliminates "squatting down" of the rear portion of the towing vehicle under the loads imposed by the vehicle being towed. Side sway or roll of the towing vehicle is also substantially eliminated and this is an important safety feature. The sub-frame arrangement described also substantially reduces stresses imposed on the main frame of the towing vehicle. The configuration described also provides for good weight distribution thus assisting in ensuring that an adequate degree of weight is applied to the front axle of the towing vehicle thereby to ensure that steering control is adequately maintained.

The lifting and towing apparatus can also be made and sold at a relatively low cost; it is thus a relatively affordable unit applicable to a wide range of vehicles such as pick-up trucks in the one-quarter to one tone range and also recreational vehicles such as those known under the trademarks "Bronco", "Blazer", and "Jeep". By virtue of the affordability of the unit, it will be particularly attractive to small service station operators and garage owners.

The lifting and towing apparatus may also be attached or removed from the towing vehicle in the completely assembled condition. As noted previously it can be attached or detached in a relatively short period of time by unskilled personal using conventional tools and techniques.

The apparatus according to the invention also provides for relatively high clearance i.e. there is no significant loss in the original ground clearance of the vehicle and, by virtue of the load transmitting capability of the sub-frame and the associated equipment, this ground clearance is not lost to any significant degree when a vehicle is being towed.

There has been shown and described a specific embodiment of the invention. It will be readily apparent to those skilled in the art from the foregoing description that many changes in details of construction may be made without departing from the spirit of the invention as defined in the appended claims.

I claim:

1. The combination of a vehicle having a main frame extending longitudinally thereof, a vehicle floor above the main frame, a rear axle assembly, suspension springs interposed between said main frame and the rear axle assembly and a lifting and towing apparatus mounted beneath the floor at the rear portion of the vehicle and comprising:

(a) bracket means having first pivot means associated therewith defining a main pivot axis, said bracket means being firmly connected to rearwardly disposed transversely spaced apart portions of the main frame of the vehicle;

(b) a lifting frame pivotably secured to said bracket means via the first pivot means for pivoting movement between a raised and a lowered position about said main pivot axis;

(c) means on said lifting frame for engaging another vehicle to be lifted and towed;

(d) an elongated sub-frame mounted to the main frame of the vehicle in general parallelism thereto for generally rectilinear movement longitudinally relative to said main frame, said sub-frame being connected to said lifting frame via a second pivot means spaced from said main pivot axis, so that said longitudinal movement of said sub-frame causes the pivoting movement of said lifting frame;

(e) actuator means operatively interconnected between the main frame and said sub-frame for moving said sub-frame longitudinally relative to the main frame and effecting the pivoting movement of said lifting frame between said raised and lowered positions;

(f) said elongated sub-frame extending forwardly of the vehicle to a point forward of the rear axle assembly of the vehicle, said sub-frame being arranged such that in the longitudinal position it occupies when the lifting frame is in the raised position, the loading applied to said lifting frame is transmitted through said main frame to said sub-frame and from the sub-frame to said rear axle assembly and thereafter to the ground via said rear axle such that, in use, the suspension springs are sufficiently isolated from the loadings applied to the lifting frame that any tendency for the vehicle to squat down or sway under the influence of the loadings applied thereto is reduced sufficiently as to avoid substantial loss of vehicle ground clearance.

2. The combination according to claim 1, wherein said sub-frame includes a pair of spaced elongated members each located beneath longitudinally extending members of the main frame and attachment means securing said sub-frame to said main frame while permitting sliding motion of said sub-frame relative to said main frame.

3. The combination according to claim 1, wherein said sub-frame includes a pair of spaced elongated members each located beneath longitudinally extending members of the main frame and attachment means securing said sub-frame to said main frame while permitting sliding motion of said sub-frame relative to said main frame, and said actuator means comprising hydraulic cylinder means extending longitudinally of said members of said sub-frame and adapted to effect the sliding movement of said sub-frame to effect the raising or lowering of said lifting frame.

4. The combination according to claim 1, wherein said means for engaging a vehicle to be lifted and towed is connected to said lifting frame via an extendable and retractable means, and an actuator for retracting and extending said means for engaging to move the means for engaging between a position in close proximity to the lifting frame to a position spaced from the lifting frame.

5. The combination according to claim 1, wherein said means for engaging a vehicle to be lifted and towed is connected to said lifting frame via an extendable and retractable means, and an actuator for retracting and extending said means for engaging to move the means for engaging between a position in close proximity to the lifting frame to a position spaced from the lifting frame, said means for engaging comprising a vehicle bumper section, and pivot means to permit rotation of said vehicle bumper section about horizontal and vertical axes when in said position spaced from the lifting frame, and means to secure said bumper section in a fixed position when in the retracted position.

6. The combination according to claim 1, wherein said means for engaging a vehicle to be lifted and towed is connected to said lifting frame via an extendable and retractable means, and an actuator for retracting and extending said means for engaging to move the means for engaging between a position in close proximity to the lifting frame to a position spaced from the lifting frame, said means for engaging comprising a vehicle bumper section, and pivot means to permit rotation of said vehicle bumper section about horizontal and vertical axes when in said position spaced from the lifting frame, and means to secure said bumper section in a fixed position when in the retracted position, said vehicle bumper section comprising an intermediate bumper section, said apparatus further comprising a pair of spaced bumper sections fixed to said bracket means and in flanking relation to said intermediate bumper section when the intermediate bumper section is in its retracted position.

7. The combination of a vehicle including a vehicle body and a main frame therefor, an axle assembly, suspension springs between the axle assembly and main frame, and a lifting and towing apparatus mounted below the body of the vehicle and comprising:

(a) bracket means having first pivot means associated therewith and defining a main pivot axis and fixedly mounted to laterally spaced apart rearwardly disposed portions of the main frame of the vehicle;

(b) a lifting frame pivotally secured to said bracket means via the first pivot means for pivoting movement about the main pivot axis between a raised and a lowered position for raising and lowering another vehicle when secured to said lifting frame;

(c) actuator means operatively connected to said lifting frame for effecting said pivoting movement of said lifting frame;

(d) load transmitting means operatively connected to said actuator means and movable simultaneously with said lifting frame to a position such that, during use, with said lifting frame raised, loadings applied to said lifting frame are transmitted from the main frame of the vehicle to the axle assembly thereof via said load transmitting means so that, in use, the suspension springs are sufficiently isolated from loadings applied to the lifting frame that the tendency for the vehicle to squat down or sway under the extra loadings applied by the vehicle being lifted or towed is substantially reduced.

8. The combination according to claim 7 wherein said load transmitting means comprises an elongated sub-frame mounted to the main frame of the vehicle for generally rectilinear movement longitudinally of the main frame, said sub-frame being connected to said lifting frame via second pivot means spaced from said main pivot axis so that longitudinal movement of the sub-frame causes the pivoting movement of said lifting frame, said actuator means being operatively connected via said sub-frame to said lifting frame.

9. The combination according to claim 7, including means for engaging the vehicle to be lifted and towed, said means for engaging being connected to said lifting frame via a telescoping assembly, and a hydraulic actuator within said telescoping assembly for extending and retracting said means for engaging to move the latter between a position in close proximity to the lifting frame to a position spaced from the lifting frame.

10. The combination according to claim 7, including means for engaging the vehicle to be lifted and towed, said means for engaging being connected to said lifting frame via a telescoping assembly, and a hydraulic actuator within said telescoping assembly for extending and retracting said means for engaging to move the means for engaging between a position in close proximity to the lifting frame to a position spaced from the lifting frame, said means for engaging comprising a vehicle bumper section, and pivot means to permit rotation of said vehicle bumper section about horizontal and vertical axes when in said position spaced from the lifting frame, and means to secure said bumper section in a fixed position when in the retracted position.

11. The combination according to claim 7, including means for engaging the vehicle to be lifted and towed, said means for engaging being connected to said lifting frame via a telescoping assembly, and a hydraulic actuator within said telescoping assembly for extending and retracting said means for engaging to move the latter between a position in close proximity to the lifting frame to a position spaced from the lifting frame, said means for engaging comprising a vehicle bumper section, and pivot means to permit rotation of said vehicle bumper section about horizontal and vertical axes when in said position spaced from the lifting frame, and means to secure said bumper section in a fixed position when in the retracted position, said vehicle bumper section comprising an intermediate bumper section, said apparatus further comprising a pair of spaced bumper sections fixed to said bracket means and in flanking relation to said intermediate bumper section when the intermediate bumper section is in its retracted position.

12. A lifting and towing apparatus adapted to be mounted below the body of a vehicle having a main frame and an axle assembly and suspension springs between the axle assembly and main frame, said apparatus comprising:
    (a) bracket means including pivot means associated therewith defining a main pivot axis and mountable to rearwardly disposed transversely spaced portions of the main frame of the vehicle;
    (b) a lifting frame pivotally secured to said bracket means for pivoting movement about the main pivot axis between a raised and a lowered position for raising and lowering another vehicle when secured to said lifting frame;
    (c) actuator means operatively connected to said lifting means for effecting said pivoting movement of said lifting frame; and
    (d) means for engaging the vehicle to be lifted and towed, said means for engaging being a vehicle bumper section and being connected to said lifting frame via a telescoping assembly, and a hydraulic actuator within said telescoping assembly for extending and retracting said means for engaging to move the means for engaging between a position in close proximity to the lifting frame to a position spaced from the lifting frame.

13. Apparatus according to claim 12 further including pivot means to permit rotation of such vehicle bumper section about horizontal and vertical axes when in said position spaced from the lifting frame, and second bracket means to secure said bumper section in a fixed position when in the retracted position.

14. Apparatus according to claim 12 further comprising a pair of spaced bumper sections fixed to said bracket means and in flanking relation to said intermediate bumper section when the intermediate bumper section is in its retracted position.

15. The combination of a vehicle including a vehicle body and a main frame therefor, an axle assembly, suspension springs between the axle assembly and main frame, and a lifting and towing apparatus according to claim 12 mounted below the vehicle body and with said bracket means mounted to said rearwardly disposed portions of said main frame.

16. A lifting and towing apparatus adapted to be mounted beneath the floor at the rear portion of a vehicle having a main frame, a rear axle assembly and suspension springs interposed therebetween, said apparatus including: bracket means having first pivot means associated therewith defining a main pivot axis and connectable to rearwardly disposed portions of the main frame of the vehicle; a lifting frame pivotally secured to said bracket means via the first pivot means for pivoting movement between a raised and a lowered position about said main pivot axis; actuator means for effecting the pivoting movement of said lifting frame; means on said lifting frame for engaging another vehicle to be lifted and towed; said apparatus being characterized by a sub-frame adapted to be mounted to the main frame of the vehicle for movement relative thereto, said sub-frame being connected to said lifting frame via second pivot means spaced from said first pivot means so that the relative movement of said sub-frame and the pivoting movement of said lifting frame occur simultaneously; said sub-frame being arranged such that in the position it occupies relative to the main frame when the lifting frame is in the raised position loadings applied to said lifting frame are transmitted through saidm main frame to said sub-frame and from the latter to said rear axle assembly such that the suspension springs are at least partly isolated from the loadings applied to the lifting frame whereby, in use, to offset any tendency for the vehicle to squat down or sway under the influence of the loadings applied to said lifting frame, characterized in that said means for engaging a vehicle to be lifted and towed is connected to said lifting frame via an extendable and retractable means, and an actuator for retracting and extending said means for engaging whereby to move the latter between a position in close proximity to the lifting frame to a position spaced therefrom and, in that said means for engaging comprises a vehicle bumper section, and pivot means to permit rotation of such vehicle bumper section about horizontal and vertical axes when in said position spaced form the lifting frame, and means to secure said bumper section in a fixed position when in the retracted position.

17. Apparatus according to claim 16 further characterized in that said vehicle bumper section comprises an intermediate bumper section, and a pair of spaced bumper sections fixed to said bracket means and in flanking relation to said intermediate bumper section when the latter is in its retracted position.

* * * * *